Nov. 26, 1929.  J. P. SADLER, JR  1,737,476
UPHOLSTERY COVER
Filed March 26, 1928  2 Sheets-Sheet 1

INVENTOR.
Joseph P. Sadler Jr.
BY William C. Linton
ATTORNEY.

Nov. 26, 1929.　　　J. P. SADLER, JR　　　1,737,476
UPHOLSTERY COVER
Filed March 26, 1928　　　2 Sheets-Sheet 2
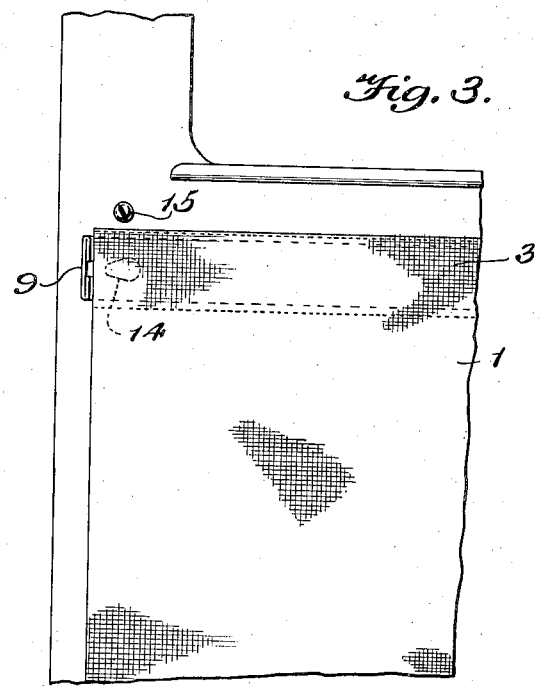
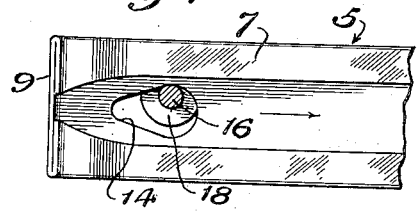
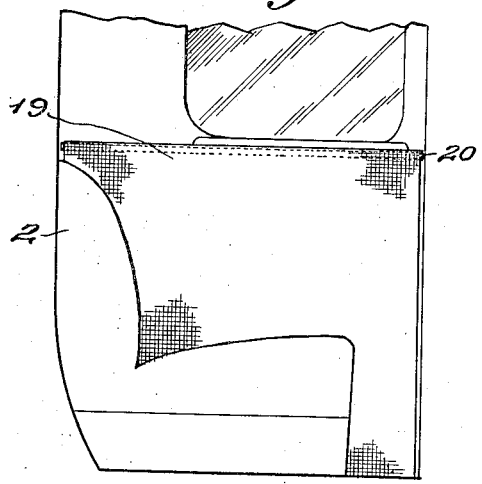
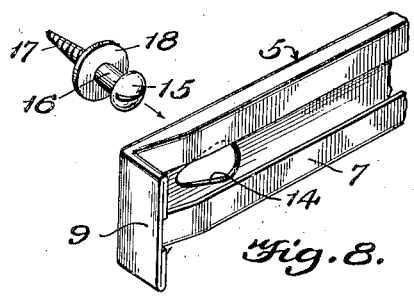
INVENTOR.
Joseph P. Sadler Jr.
BY
William C. Linton
ATTORNEY.

Patented Nov. 26, 1929

1,737,476

UNITED STATES PATENT OFFICE

JOSEPH PERKINS SADLER, JR., OF RICHMOND, VIRGINIA

UPHOLSTERY COVER

Application filed March 26, 1928. Serial No. 264,607.

This invention relates to improvements in upholstery covers of that design employed to cover and protect the upholstery of automobile body interiors, having for an object to provide a novel form of means for securing the door covering pieces, side panel covering pieces and possibly other similar covering pieces of an over upholstery or cover set in positive, smooth and effectual relationship to the corresponding upholstered elements or portions of an automobile interior, permitting such securing to be accomplished with but a minimum of effort and time outlay and also, effecting the same without the usage of those types of fasteners that are secured directly to the automobile upholstery, such for example as pin fasteners of the penetrating prong species or separable fasteners, the anchoring elements of which are engaged by pins or similar devices directly with the upholstery and are adapted to have companion elements carried upon complemental portions of the covers and detachably engaged thereover that a connection of the covers in adjusted relation to the upholstery may be effected, the improvements expressed through the medium of the invention avoiding thereby, the tearing or pulling or other damaging of the upholstery of an equipped automobile body interior.

It is also amongst the principal desiderata of the invention to provide an upholstery covering securing means wherein the covers will be evenly secured in adjusted or installed relation with respect to the automobile body upholstery entirely along their respective marginal portions, hence, preventing such covers from pulling away or partially pulling away from the upholstery and also, preventing the presence of irregular or substantially scalloped like formations, as where the covers are secured to upholstery through the usage of fastener devices engaging portions thereof at relatively spaced intervals, hence, lending materially to the nicety of appearance of the covers as well as materially increasing the efficiency with which they will serve.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of my invention.

Figure 1:
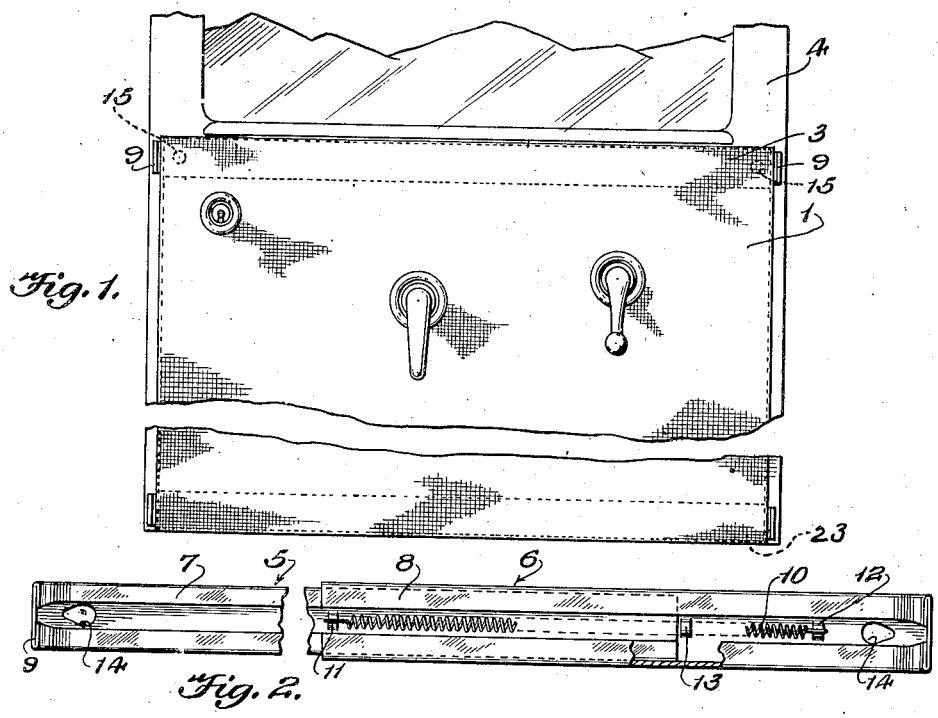
Figures 2, 5, 6:
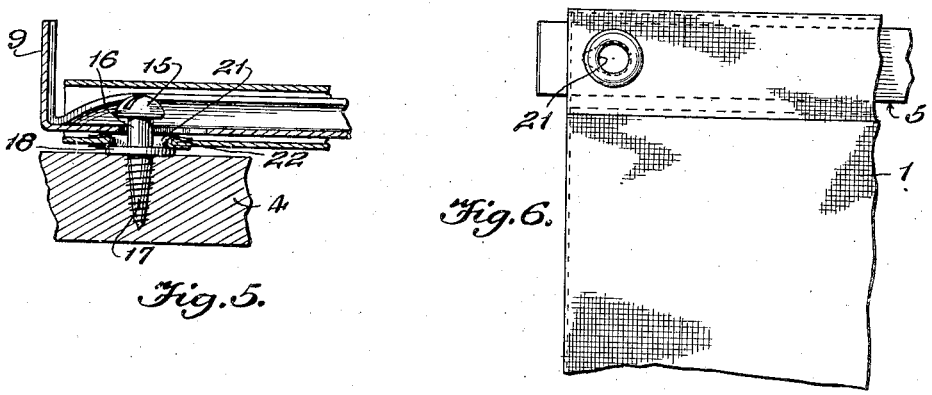

In these drawings:

Figure 1 is a fragmentary elevation of the inner side of an automobile body door wherein the upholstered surface of said door is equipped or provided with the improved cover securing means, Figure 2 is a detail in side elevation of one of the adjustable cover securing bars, Figure 3 is a fragmentary detail in elevation illustrating the inner and upholstered side of an automobile body door in process of being fitted or equipped with an upholstery cover secured thereto through the medium of the invention, Figure 4 is a fragmentary detail in elevation of the inner side of a side panel of an automobile body interior wherein the upholstery of the same is covered and the covering piece is secured in position through the medium of the improved device, Figure 5 is an enlarged fragmentary detail in section illustrating the manner in which detachable engagement of the opposite ends of the cover securing bar is effected with the automobile body upholstery, Figure 6 is an enlarged detail in elevation illustrating the reverse or normally inner side of an upholstery cover in which one of the improved securing bars is arranged, Figure 7 is an enlarged fragmentary detail in elevation illustrating the peculiar formation of the fastening stud receiving openings formed in the opposite ends of the bars of the securing devices showing how relative vertical movement is imparted to said bars subsequently to engagement of the same with their respective fastening studs that opposite pulls will be imparted to the cover pieces that they will be held taut and smoothly over upholstered surfaces to be covered thereby.

Figure 9:
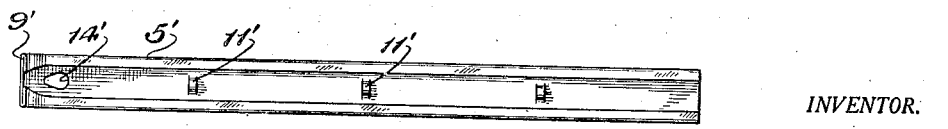

Figure 8 is a fragmentary detail in perspective illustrating the relative arrangement of one of the fastening studs and one end of a cover piece securing bar showing how the same are relatively adjusted immediately prior to engagement of the bar with the stud, and Figure 9 is a detail in elevation illustrating a slightly modified form of covering piece securing bar.

Having more particular reference to the drawings in connection with whch like characters of reference will designate corresponding part throughout, it may be stated at the outset that the invention herein expressed provides a means for evenly and effectually securing the opposite extremities of over upholstery or upholstery covering pieces in relatively smooth engagement with certain portions of the interior of an automobile body, such for example, as the upholstered portions of the body doors, the side panels of the body, etc. To this end, upholstery covering pieces patterned to match the particularly upholstered surfaces to be covered thereby, are provided, certain of these covering pieces being herein illustrated and indicated for convenience by the numerals 1 and 2.

With those types or patterns of upholstery covering pieces, such as is designated by the numeral 1 in the accompanying drawings, the opposite end portions of the pieces are provided with hems 3 extending completely throughout the same.

That the pieces such as illustrated by the numeral 1 herein may be detachably secured over the upholstered surface of the automobile door 4, I provide adjustable securing bars such as is illustrated in the Figure 2, this bar comprising sections 5 and 6, each of which are formed throughout their respective lengths and along their opposite sides with right angularly formed and inwardly disposed flanges 7 and 8; the opposite or outer extremities of said sections being substantially flattened and formed with right angularly disposed extremities serving as finger pieces 9. In this connection, it will be noted that the relative widths of the flanges 6 and 7 is such that longitudinally disposed pockets will be formed throughout the intermediate portions of said sections 5 and 6 and furthermore, that the cross sectional size and shape of the section 5 is such as will permit of the snug telescopic engagement within the section 6. That these telescopically engaged sections 5 and 6 will be normally held at their innermost relative positions, a coiled spring 10 is provided, one end of said spring being secured to an ear or eye 11 struck outwardly from an intermediate portion of the section 7, while the opposite end of said spring is secured to a similar device 12 struck from a portion of the section 6, preferably in proximity to its particular outer end. Thus, it will be seen that said sections 5 and 6 will be normally held in their contracted positions and to limit this relative inward sliding movement as between the sections, a stop or tongue 13 is struck inwardly from a portion of the section 6 at a distance slightly inwardly of the device 12, said stop being adapted to be engaged by the inner end of the section 5 and thus, to limit the inward sliding movement of said section with relation to the section 6. In this way, it will be appreciated that the insertion of the securing bar through a hem of the covering piece 1 will be materially facilitated and furthermore, that the outward buckling of the spring 10 due to excessive inward movement of the section 5 with relation to the section 6 will be prevented.

With a view toward providing the securing bar with means for effecting its detachable engagement with the appropriate portion of an automobile body interior whose particular upholstered surface is to be covered with pieces such as illustrated by the numerals 1 and 2, I form in the opposite or relatively outer extremities of the bar, that is, in the outer extremities of the sections 5 and 6, outwardly tapering openings 14, disposing these openings longitudinally of their respective sections 5 and 6 and having the larger and inward portions thereof of a size such as will permit of comparatively easy or ready slidable engagement of the same over the enlarged heads 15 of the securing studs 16 formed with screw threaded shanks 17 and with annular stop shoulders 18.

These securing studs are turned into engagement with the walls of those particular upholstered portions of an automobile body interior to be equipped with the improved covers and in placing the same, a pair thereof, as is shown in the Figure 1, are adapted to be arranged adjacent the upper extremity of the upholstered surface of the door 4 whereas another pair are adapted to be engaged with the door adjacent the lower portion thereof as is clearly shown in this particular figure of the drawing. With the studs so engaged, it will be seen that their inward movement will be limited by means of the annular stop shoulders 18 and consequently upon this, that the portions 16 thereof will be extended from the adjacent upholstered portions, hence, facilitating an effectual engagement of the openings 14 in the opposite extremities of the securing bar thereover. With engagement of the bars over the heads 15 of the securing studs, the finger pieces 9 thereof are released by the person installing them whereupon the contractile coiled spring 10 will serve to impart relative inward movement to said sections 5 and 6, drawing the openings 14 over the portions 16 of the stud until such portions are received in the constricted outer ends of the opening. At this time, it will be appreciated that outward disengagement or displacement of the bar with respect to the headed studs will be prevented and furthermore, it will be understood that because of the movement of the outwardly tapered openings 14 over the portions 16 of the fastening studs, a comparatively vertical or longitudinal pull will be imparted to the covering piece 1, hence smoothly arranging it over the upholstered surface of the door 4 and holding it sufficiently taut to insure of a neat and finished appearance. Furthermore, because of the disposition of the securing bars through the marginally disposed hems 3 of the covering piece 1, it will be seen that said marginal portions of the covering piece will be regularly or evenly secured throughout their respective lengths and furthermore, that the pulling of the same into irregular or scalloped formations will be absolutely avoided.

In securing those coverings such as illustrated herein, designated by the numeral 2 in position, it is to be understood that the lower marginal portions of said pieces 2 to which rigidity may be imparted by means of a rod or bar 23 are secured by studs or other suitable screw threaded fastening devices to the lower portion of the automobile body panel, whereas the upper portion of the piece is provided along its margin with a hem 19. Through this hem, there is passed a securing bar such as hereinbefore described and illustrated in the Figure 2, the opposite extremities of said bar being engaged over studs such as illustrated in the Figure 4 by the numeral 20, the finger pieces of the rod then being released so that the sections 5 and 6 thereof will move under urge of the coiled spring 10 to their innermost positions and in so doing, will draw the portions 16 of said studs 20 into the reduced outer extremities of the openings 14 and at the same time, with such movement of the portions 16 of the stud into the extremities of said openings, impart a longitudinal pull to the piece 2, thereby securing it in relatively smooth and taut relation over the upholstery of the side panel of the automobile body interior.

As is shown in the Figure 3, when covering pieces such as designated by the numeral 1 are to be engaged over the upholstered inner surface of a door 4 or over another upholstered surface of an automobile body interior wherein the opposite ends of said piece are secured in position through the medium of the securing bars, that securing bar passed through the lowermost hem 3 is first expanded and engaged by way of the openings 14 over the heads of the lowermost studs, following which the upper or remaining portion of the covering piece is moved upwardly and the securing bar passed through the hem therein is adjusted so that the openings 14 thereof may register with and be engaged over the headed portions of the uppermost pair of studs. Following this engagement, the last mentioned securing bar is released whereupon with movement of the tapered openings 14 over the portions 16 of the studs, a longitudinal pull will be imparted to said piece 1, thereby bringing the same into smooth and taut covering engagement with respect to the upholstered portion of the automobile door 4.

In forming openings 21 in those portions of the hems 3 and 19 adapted to receive the securing bar and the headed extremities 15 of the studs through the openings 14 of said bars, I may and preferably do engage conventional forms of eyelets 22 with the fabric, thus preventing the raveling of the fabric out about said studs and also, avoiding the possibility of tearing or otherwise damaging the fabric due to its subjection to stresses applied to the same during usage.

In the Figure 9, I have illustrated a slightly modified form of section for telescopic or slidable engagement in the section 6, said section being indicated herein by the numeral 5′ and consisting of a marginally flanged body portion having a flattened outer end formed with a right angularly disposed finger engaging piece 9′ and with an outwardly tapering opening 14′; the body portion of said section being formed with a series of relatively spaced inwardly struck ears or similar devices 11′ which are adapted to be selectively engaged by one end of the contractile coiled spring 10. By this particular formation, of section 5′, it will be understood that securing bars of different lengths may be produced merely by cutting the section 5′ to the proper length and using the particularly adjacent ear 11′ as a means for securing the corresponding end of the coiled spring 10 thereto.

Obviously, to disengage upholstery pieces employing my improved fastening devices from the inner sides of doors or side panels or other interior portions of an automobile body, it is only necessary that the sections 5 and 6 of said bars be engaged through the medium of their respective finger pieces 9 and said sections moved outwardly until the enlarged inner portions of the openings 14 register with the heads 15 of the securing studs whereupon said securing bars may be readily disengaged from the studs and the covering pieces thus freely removed. Following this removal of the covering pieces, the securing bars may be readily slid from their respective hems 3 or 19 of the pieces and such pieces at this time may be conveniently and effectually laundered, whereupon they may be reinstalled in the automobile body in the manner hereinbefore set forth.

Manifestly, the construction shown is capable of considerable modification and such modification as is within the scope of my claims, I consider within the spirit of my invention.

I claim:

1. In combination with an upholstery cover having means at one end thereof to fasten the same to the upholstery, slidably interengaged rods removably received throughout their lengths in a portion of said cover at the other end thereof, spring means connected to said sections for normally imparting an urge of relatively inward movement therebetween, the opposite ends of said sections having outwardly tapered openings formed therein, supporting means, said outwardly tapered openings being adapted to be engaged over said supporting means and only the outer side marginal portions of said openings having slidable bearing contact with the supporting means, whereby with such slidable bearing contact over the supporting means, to cause said slidably interengaged sections to be moved in a direction at substantially right angles to their longitudinal axes for imparting an outward pull to the upholstery cover.

2. In combination with an upholstery cover having means at one end thereof to fasten the same to the upholstery, supporting means, members slidably and detachably engageable with each other received in a portion of the upholstery cover at the other end thereof, portions of said members having outwardly tapered openings therein adapted to receive the supporting means therethrough, and means on said members urging them into slidable bearing contact with said supporting means only upon the outer sides of said tapered openings to cause said members to move in a direction at substantially right angles to their longitudinal axis.

3. In combination with an upholstery cover having means at one end thereof to fasten the same to the upholstery, supporting means, complementary members received in a portion of the upholstery cover at the other end thereof, portions of said members having outwardly tapered openings therein adapted to receive the supporting means therethrough, and means on said members urging them into slidable bearing contact with said supporting means only upon one of the sides of said tapered openings to cause said members to move in a substantially right angular direction with respect to their longitudinal axis whereby to impart a pull to said cover.

In witness whereof I have hereunto set my hand.

JOSEPH PERKINS SADLER, Jr.